United States Patent [19]

Danzig

[11] 4,281,047
[45] Jul. 28, 1981

[54] ZINC ELECTRODE MADE FROM A MODIFIED ZINC OXIDE FOR USE IN RECHARGEABLE ELECTROCHEMICAL CELLS

[75] Inventor: Ivan F. Danzig, Gainesville, Fla.

[73] Assignee: General Electric Company, Gainesville, Fla.

[21] Appl. No.: 158,485

[22] Filed: Jun. 11, 1980

[51] Int. Cl.$^3$ .................................................. H01M 10/30
[52] U.S. Cl. .................................... 429/217; 429/223; 429/230; 429/231
[58] Field of Search .............. 429/206, 217, 229–232, 429/223; 252/182.1

[56] References Cited

U.S. PATENT DOCUMENTS

| | | | |
|---|---|---|---|
| 2,738,375 | 3/1956 | Schlotter | 429/231 X |
| 2,865,974 | 12/1958 | Scheuerle et al. | 429/231 |
| 2,987,567 | 6/1961 | Freas et al. | 429/229 |
| 3,208,880 | 9/1965 | Bode et al. | 429/206 |
| 3,226,260 | 12/1965 | Drengler | 429/136 |
| 3,236,695 | 2/1966 | Horowitz | 429/206 |
| 3,245,839 | 4/1966 | Rosser et al. | 429/206 |
| 3,476,601 | 11/1969 | Berger et al. | 429/218 |
| 3,485,673 | 12/1969 | Jost | 429/54 |
| 3,493,434 | 2/1970 | Goodkin | 429/231 |
| 3,505,113 | 4/1970 | Merten et al. | 429/51 |
| 3,615,830 | 10/1971 | Johnson | 429/206 |
| 3,617,592 | 11/1971 | Arrance et al. | 264/61 |
| 3,816,178 | 6/1974 | Maki et al. | 429/206 |
| 3,853,625 | 12/1974 | Louzos | 429/229 |
| 3,870,564 | 3/1975 | Takamura et al. | 429/190 |
| 4,091,181 | 5/1981 | Merritt, Jr. | 429/231 X |
| 4,091,193 | 5/1978 | Horowitz et al. | 429/219 |

*Primary Examiner*—Anthony Skapars
*Attorney, Agent, or Firm*—Morgan, Finnegan, Pine, Foley & Lee

[57] ABSTRACT

An improved zinc electrode for use in rechargeable nickel-zinc electrochemical cells having greatly enhanced cycle life is disclosed, which comprises in admixture Zn, ZnO, HgO and an organic liquid binder produced via the reaction of diacetone acrylamide (DAA) and acrylic acid, which mixture has beem formed into a paste and uniformly applied to a suitable current collector, wherein the ZnO component has an average surface area of about 3.5–4.0 m$^2$/gr and contains about 0.08 to 0.11 percent by weight Cd and about 0.05 to 0.08 percent by weight Pb, and has a generally rod-like particle structure.

8 Claims, No Drawings

ZINC ELECTRODE MADE FROM A MODIFIED ZINC OXIDE FOR USE IN RECHARGEABLE ELECTROCHEMICAL CELLS

This invention also relates to a novel rechargeable nickel-zinc electrochemical cell having greatly enhanced cycle life wherein the zinc electrode comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 3.5–4.0 $m^2/gr$ and contains about 0.08 to 0.11 percent by weight Cd and about 0.05 to 0.08 percent by weight Pb, and has a generally rod-like particle structure.

BACKGROUND OF THE INVENTION

The utilization of zinc electrodes in rechargeable nickel-zinc electrochemical cells and methods for their preparation are well known. Nevertheless, numerous problems exist involving the design and use of current-producing rechargeable electrochemical cells which derive in part from the phenomena of the redeposition of active materials upon one of the electrodes. Rechargeable electrochemical cells utilizing Zn/ZnO electrodes have heretofore been prone to exhibiting the growth of Zn dendrites during the charging phase of such cells.

For a typical nickel-zinc rechargeable cell, the number of charge/discharge cycles to which a given cell may be subjected will be limited by the above-mentioned dendrite formation problem which severely limits the useful life of such cells by effectively shorting the cell.

The dendrite formation problem in a typical rechargeable nickel-zinc electrochemical cell is understood to be caused by the fact that the zinc goes through a soluble species stage during each charge/discharge cycle. During the discharge period of each such cycle zinc hydroxide is formed.

Zinc hydroxide is highly soluble in alkaline systems, such as the electrolytic environment in which these cells operate, and, therefore, readily goes into solution in such an electrolytic medium. Eventually, the limit of solubility is reached and the zinc hydroxide precipitates out of solution. Upon recharging the cell, zinc is plated out of the saturated solution, thus allowing more zinc hydroxide to enter into the solution.

The problem revolves around the fact that the zinc which comes out of the saturated solution can, and often does, plate out at one point on the electrode surface and, when this occurs, a dendrite eventually forms, shorting the zinc/zinc oxide electrode to the nickel electrode.

A further problem which is encountered involves the fact that a "shape change" occurs in the crystal structure of the zinc which is deposited by plating from the saturated solution onto the surface of the zinc/zinc oxide electrode.

Ordinarily, a fine zinc deposit on the surface of the electrode is necessary in order to maintain a high surface area exposed to the electrolytic solution. When zinc hydroxide comes out of the solution and is subsequently redeposited on the surface of the electrode, as described above, coarse deposits of zinc may be formed which do not possess the requisite high surface area characteristics which are required, thus inherently limiting the useful capacity of the electrode and, therefore, of the rechargeable electrochemical cell.

It has been suggested that relatively high levels of PbO and CdO, in the order of 2 percent by weight PbO and 0.5 percent by weight CdO, have a beneficial effect in reducing the shape change which occurs upon the deposition by plating of zinc on a zinc electrode. See O. Wagner and A. Himy "Substitutes for Mercury in Alkaline Zinc Batteries" (27th Power Source Symposium).

However, neither this nor any other reference of which the applicant is aware makes any mention as to an improvement in the dendrite formation problem referred to above nor in achieving an increase in cycle life for rechargeable electrochemical cells.

It has now been discovered that superior zinc/zinc oxide electrodes for utilization in the construction of rechargeable nickel-zinc electrochemical cells may be prepared by employing a specific type of commercially available ZnO in the manufacture of such zinc electrodes.

It has been found that by employing a ZnO component having a different combination of particle structure and level of impurities present from that of the accepted industry standard, the problem of failure by dendrite shorting is greatly decreased, thus allowing for a tenfold increase in the number of effective charge/discharge cycles for cells manufactured utilizing such improved electrodes.

DESCRIPTION OF THE INVENTION

According to the present invention there is provided an improved zinc electrode for use in rechargeable nickel-zinc electrochemical cells having greatly enhanced cycle life, which comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 3.5–4.0 $m^2/gr$ and contains about 0.08 to 0.11 percent by weight Cd and about 0.05 to 0.08 percent by weight Pb, and has a generally rod-like particle structure.

The present invention also provides for a novel rechargeable nickel-zinc electrochemical cell having greatly enhanced cycle life wherein the zinc electrode comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 3.5–4.0 $m^2/gr$ and contains about 0.08 to 0.11 percent by weight Cd and about 0.05 to 0.08 percent by weight Pb, and has a generally rod-like particle structure.

The preferred ZnO for utilization in preparing the zinc electrodes of the current invention is HORSE HEAD XX-203 zinc oxide, a commercially available material manufactured by the New Jersey Zinc Division of the Gulf & Western Natural Resources Group, or the equivalent.

HORSE HEAD XX-203 is advertised by the manufacturer as a specialty zinc oxide designed and advertised to meet rigid standards for color and brightness in rubber and for freedom from foreign matter, and was developed for use in whitewalls of tires and other white or tinted rubber articles to provide not only uniform activation, high reinforcement and excellent resistance to flex-cracking, but also excellent color and brightness. No advantages have heretofore been attributed to HORSE HEAD XX-203 in the area of any potential improvement to be achieved in the manufacture of zinc electrodes utilizing such materials.

| HORSE HEAD XX-203 zinc oxide is advertised by the manufacturer to have the following physical properties and chemical analysis:* | | | |
|---|---|---|---|
| TECHNICAL DATA (Typical Values) Physical Properties | | Chemical Analysis | |
| Mean Particle Size (microns) | 0.27 | ZnO | 99.2% |
| Surface Area (Sq. meters/gram) | 4.0 | PbO | 0.08 |
| Specific Gravity in Rubber | 5.6 | CdO | 0.05 |
| Specific Volume in Rubber | 0.18 | Cu | 0.002 |
| Thru 325 Mesh Screen | 99.99% | Mn | 0.001 |
| Package Density (lbs.ft$^3$) | 30 | Acidity as SO$_3$ | 0.1 |
| Specifications | ASTM D-79 | Total S as SO$_3$ | 0.25 |
| Fed. Spec. TT-P-463a (Grade A) | | H$_2$O Soluble Salts | 0.60 |
| | | Loss at 110° C. | 0.2 |
| | | Insoluble in Acetic Acid | 0.05 |

*Source: NJZ Pigment Data Sheet re HORSE HEAD XX-203 zinc oxide.

The accepted industry standard for use in the preparation of zinc electrodes is USP-12 zinc oxide, also commercially available from the New Jersey Zinc Division of Gulf & Western Natural Resources Group.

Another type of ZnO which has been recently discovered by the applicant, and which is the subject of a separate copending application, to be beneficial when used as a component of a zinc electrode for use in a rechargeable nickel-zinc electrochemical cell is KADOX-25 zinc oxide which is another commercially available material manufactured by the New Jersey Zinc Division of Gulf & Western Natural Resources Group.

As noted in the applicant's copending application directed to the use of KADOX-25 zinc oxide, or the equivalent, electrochemical cells manufactured utilizing such zinc oxide failed by dendrite shorting only after 28-31 charge/discharge cycles, as compared to failure at about 14 charge/discharge cycles for cells manufactured utilizing a zinc electrode prepared from USP-12 zinc oxide, which has heretofore been accepted as the industry's standard for such applications.

It has been further surprisingly discovered that rechargeable nickel-zinc electrochemical cells manufactured utilizing a zinc electrode which has been prepared employing HORSE HEAD XX-203 zinc oxide failed due to dendrite formation only after 113 charge/discharge cycles which is far superior to the 14 charge/discharge cycles to shorting with USP-12 zinc oxide or even to the 28-31 charge/discharge cycles experienced using KADOX-25 zinc oxide.

It is believed that the synergistic combination of the unique rod-like crystalline structure and somewhat higher levels of Cd and Pb present in HORSE HEAD XX-203 materially contribute to the ten-fold increase in the charge/discharge cycle life demonstrated by cells employing zinc electrodes prepared from this particular type of material.

Apparently, the synergistic effect of the particular crystalline structure of HORSE HEAD XX-203, which differs materially from that of both USP-12 zinc oxide and KADOX-25 zinc oxide, in combination with levels of Cd of approximately 0.08 to 0.11 percent by weight and Pb of approximately 0.05 to 0.08 percent by weight renders HORSE HEAD XX-203 uniquely suitable as a component of zinc electrodes to be utilized in a rechargeable nickel-zinc electrochemical cell, since with such cell construction the number of charge/discharge cycles experienced before shorting due to the formation of dendrites is increased approximately ten-fold.

The zinc electrodes, as well as the nickel-zinc electrochemical cells which are manufactured using such electrodes, of the present invention may be manufactured via a variety of known conventional methods all of which are well known to those skilled in the art and require no further elaboration here.

DESCRIPTION OF THE PREFERRED EMBODIMENTS

The following examples will serve to illustrate the present invention and are set forth for illustrative purposes only and are not to be construed as limiting the scope of the invention.

EXAMPLES I-III

Physical and chemical analyses were undertaken on USP-12 zinc oxide, KADOX-25 zinc oxide and HORSE HEAD XX-203, in order to substantiate the published literature values, and to provide a consistent basis for comparison.

Table 1 sets forth the results of analyses undertaken.

Scanning electron micrographs (SEM) were also prepared from samples of USP-12, KADOX-25, and HORSE HEAD XX-203, in order to determine their particle structure. It has been determined that USP-12 and KADOX-25 are both composed of similar shaped particles which were somewhat cubic to amorphous with some crystallinity evident. Whereas, HORSE HEAD XX-203 is composed of particles which are generally rod-like and somewhat crystalline.

Based upon the indicated physical and chemical characteristics, it is hypothesized that the increased cycle life which is displayed by electrochemical cells utilizing electrodes prepared from HORSE HEAD XX-203 over those prepared from either USP-12 or KADOX-25, is the effective result of the synergistic combination of a unique particle structure and the particular levels of Pb and Cd present. A zinc electrode prepared using a HORSE HEAD XX-203, or the equivalent, dramatically reduces the formation of dendrites.

TABLE 1

| CHEMICAL ANALYSIS OF ZINC OXIDES | | | | |
|---|---|---|---|---|
| | | % by Weight | | Surface Area |
| Examples | ZnO Type | Cd | Pb | Zn | (m$^2$/gr) |
| I | USP-12 | 0.011 | — | Remainder | 4.0 |
| II | KADOZ-25 | 0.0018 | 0.0017 | Remainder | 9.2 |
| III | HORSE HEAD XX-203 | 0.11 | 0.08 | Remainder | 3.5 |

EXAMPLES IV-VI

Zinc electrodes were fabricated using USP-12 zinc oxide, KADOX-25 zinc oxide and HORSE HEAD XX-203 zinc oxide in the proportions indicated in the attached Table 2, by weighing out and dry-mixing the Zn, ZnO and HgO to which water and an organic liquid binder, prepared from the reaction product of diacetone acrylamide (DAA) and acrylic acid, were added to yield a resultant mixture of uniform paste-like consistency. This mixture was uniformly applied to a suitable current collector, i.e. expanded silver screen, and the resulting electrode air dried in a forced convection air oven at 120° to 140° F. for 1 to 16 hours. The electrode was then incorporated into a rechargeable nickel-zinc electrochemical cell consisting of two nickel electrodes between which the zinc electrode and separators are sandwiched.

Table 2 sets forth typical compositions of zinc electrodes used for preparing and testing 60 AMP-min (AM) nickel-zinc electrochemical cells. The electrodes produced according to the above procedure were 30 mils thick, had an area of 0.1577 dm$^2$ and a capacity of 2.034 Ah.

proximately equivalent for each cell as a function of cycle life prior to cell shorting.

It is, however, evident from these test results that the cycle life or number of cycles to cell shorting, for the three types of zinc oxides tested, are vastly different, since the USP-12 cell shorted at 14 cycles whereas the KADOX-25 cell shorted at 31 cycles, and the HORSE HEAD XX-203 did not short until 113 cycles.

The shorting mechanism in all cases was due to a successive build-up of dendritic zinc formed at the zinc electrode during charging which finally contacted the nickel electrode.

TABLE 3

CELL CYCLING TEST RESULTS[1,2]

| Example | ZnO Used | Cycles to Shorting | Fully Charged EOCV at C/5 Rate at Cycle | | | | | | 50% Discharged 30 AM Voltage at Cycle | | | | | |
|---|---|---|---|---|---|---|---|---|---|---|---|---|---|---|
| | | | 2 | 10 | 20 | 30 | 40 | 60 / 80 | 2 | 10 | 20 | 30 | 40 | 60 / 80 |
| VII | USP-12 | 14 | 1.890 | 1.910 | — | — | — | — | 1.619 | 1.637 | — | — | — | — |
| VIII | KADOX-25 | 31 | 1.886 | 1.901 | 1.912 | 1.735 | — | — | 1.624 | 1.637 | 1.641 | 1.642 | — | — |
| IX | HH XX-203 | 113 | 1.887 | 1.900 | 1.908 | 1.909 | 1.9C4 | 1.916 / 1.911 | 1.619 | 1.635 | 1.639 | 1.645 | 1.644 | 1.641 / 1.628 |

| | | Capacity | | | | | | | | | | | | |
|---|---|---|---|---|---|---|---|---|---|---|---|---|---|---|
| | | AM to 1.4 Volt at Cycle | | | | | | AM to 1.0 Volt at Cycle | | | | | | |
| Example | ZnO Used | 2 | 10 | 20 | 30 | 40 | 60 / 80 | 2 | 10 | 20 | 30 | 40 | 60 / 80 | |
| VII | USP-12 | 54.9 | 58.2 | — | — | — | — | 57.4 | 61.3 | — | — | — | — | |
| VIII | KADOX-25 | 54.6 | 57.8 | 57.7 | 56.0 | — | — | 56.7 | 60.3 | 60.0 | 58.3 | — | — | |
| IX | HH XX-203 | 54.0 | 56.7 | 57.3 | 57.3 | 56.5 | 55.2 / 51.3 | 56.8 | 60.1 | 59.9 | 59.3 | 58.5 | 56.6 / 54.3 | |

Notes:
[1]Separator system is Pellon Nylon/Celgard 3400 for all cells.
[2]All cells were rates as 60 amp-minutes (AM).

TABLE 2

COMPOSITIONS OF ZINC ELECTRODES

| Example | | ZnO[1] | ZnO (USP-12) | ZnO (KADOX-25) | ZnO (HH XX-203) | HgO[2] | DAA Reaction Prod. | Total |
|---|---|---|---|---|---|---|---|---|
| IV | gms | 0.5897 | 2.3513 | — | — | 0.0074 | 0.0602 | 3.0086 |
| | Wt % | 19.60 | 78.15 | — | — | 0.25 | 2.00 | 100 |
| V | gms | 0.5897 | — | 2.3513 | — | 0.0074 | 0.0602 | 3.0086 |
| | Wt % | 19.60 | — | 78.15 | — | 0.25 | 2.00 | 100 |
| VI | gms | 0.5897 | — | — | 2.3513 | 0.0074 | 0.0602 | 3.0086 |
| | Wt % | 19.60 | — | — | 78.15 | 0.25 | 2.00 | 100 |

Notes:
[1]Commercially available Grade 1222 from the New Jersey Zinc Company
[2]Red, Fisher

EXAMPLES VII–IX

Rechargeable nickel-zinc electrochemical cells of identical characteristics, except for the type of ZnO utilized in preparing the zinc electrode, were constructed in accordance with the procedure set forth in Examples IV through VI and tested under identical regimens.

Table 3 sets forth the results of testing for cells employing USP-12 zinc oxide, KADOX-25 zinc oxide and HORSE HEAD XX-203 zinc oxide in the preparation of the zinc electrode.

The results obtained, as set forth in Table 3, indicate that the end of charge voltage (EOCV), 30 AMP-min (AM) voltage and AM to 1.4 and 1.0 volts are all approximately equivalent for each cell as a function of cycle life prior to cell shorting.

Although the above examples illustrate various modifications of the present invention, other variations will suggest themselves to those skilled in the art in the light of the above disclosure. It is to be understood, therefore, that changes may be made in the particular embodiments described above which are within the fully intended scope of the invention as defined in the appended claims.

I claim:

1. A zinc electrode for use in rechargeable nickel-zinc electrochemical cells having greatly enhanced cycle life which comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 3.5–4.0 m$^2$/gr and contains about 0.08 to 0.11 percent by weight Cd and about 0.05 to 0.08 percent by weight Pb, and has a generally rod-like particle structure.

2. A zinc electrode according to claim 1 wherein the ZnO component has an average surface area of about 3.5 m$^2$/gr and contains 0.11 percent by weight Cd and about 0.08 percent by weight Pb.

3. A zinc electrode according to claim 1 wherein the ZnO component is HORSE HEAD XX-203 zinc oxide.

4. A zinc electrode according to claim 1 wherein the electrode comprises in admixture 19.6 percent by weight Zn, 78.15 percent by weight ZnO, 0.25 percent by weight HgO and 2.0 percent by weight DAA reaction product.

5. A rechargeable nickel-zinc electrochemical cell having greatly enhanced cycle life wherein the zinc electrode comprises in admixture Zn, ZnO, HgO and an organic liquid binder produced via the reaction of diacetone acrylamide (DAA) and acrylic acid, which mixture has been formed into a paste and uniformly applied to a suitable current collector, wherein the ZnO component has an average surface area of about 3.5–4.0 m$^2$/gr and contains about 0.08 to 0.11 percent by weight Cd and about 0.05 to 0.08 percent by weight Pb, and has a generally rod-like particle structure.

6. A rechargeable nickel-zinc electrochemical cell according to claim 5 wherein the ZnO component has an average surface area of about 3.5 m$^2$/gr and contains 0.11 percent by weight Cd and about 0.08 percent by weight Pb.

7. A rechargeable nickel-zinc electrochemical cell according to claim 5 wherein the ZnO component is HORSE HEAD XX-203 zinc oxide.

8. A rechargeable nickel-zinc electrochemical cell according to claim 5 wherein the electrode comprises in admixture 19.6 percent by weight Zn, 78.15 percent by weight ZnO, 0.25 percent by weight HgO and 2.0 percent by weight DAA reaction product.

* * * * *